United States Patent [19]

Purcell et al.

[11] Patent Number: 4,731,910

[45] Date of Patent: Mar. 22, 1988

[54] HOOKING MECHANISM

[76] Inventors: Elmor G. Purcell; Charlotte H. Purcell, both of 1208 Scott, Waterloo, Iowa 50701

[21] Appl. No.: 64,686

[22] Filed: Jun. 22, 1987

[51] Int. Cl.⁴ ............................................. A44B 21/00
[52] U.S. Cl. ................................................... 24/239
[58] Field of Search ............ 24/231, 241 PL, 241 SL, 24/233, 238, 239, 598, 599; 294/82.23

[56] References Cited

U.S. PATENT DOCUMENTS

| 677,626 | 7/1901 | Booth | 24/239 |
| 759,805 | 5/1904 | Broga | 24/239 |
| 3,883,170 | 5/1975 | Fricker et al. | 24/239 X |
| 4,164,453 | 12/1889 | Fleischhauer | 24/239 |
| 4,483,050 | 11/1984 | Nanni et al. | 24/238 X |
| 4,654,937 | 4/1987 | Brown | 24/239 X |

Primary Examiner—Kenneth J. Dorner
Assistant Examiner—James R. Brittain
Attorney, Agent, or Firm—Zarley McKee, Thomte, Voorhees & Sease

[57] ABSTRACT

A hooking mechanism for quick, easy and reliable securing including a shank having one end securable to a connecting member, and having first and second yoke arms extending outwardly at its opposite end. The yoke arms are curved to define a generally annular yoke but have a gap between their outermost ends. A locking member is slidable and retained by retaining member on one of the yoke arms, and is slidable into a retaining member on the other yoke arm to close the gap between the yoke arms and lock the hooking mechanism. The rear portion of the hooking member extends rearwardly from the yoke towards the shank and is slidably securable to one end of an actuator member. The actuator member is flexible yet resilient and biases the locking member to a closed position whereby the locking member is retained in the retaining of the first and second yoke arms and blocks the gap. Depression of the actuator member moves the locking member out of the retaining of the second yoke arm and opens at least a portion of the gap so that the hooking mechanism can receive a connector member to be hooked. Release of the actuator member causes the locking member to move back to the locked postion.

13 Claims, 4 Drawing Figures

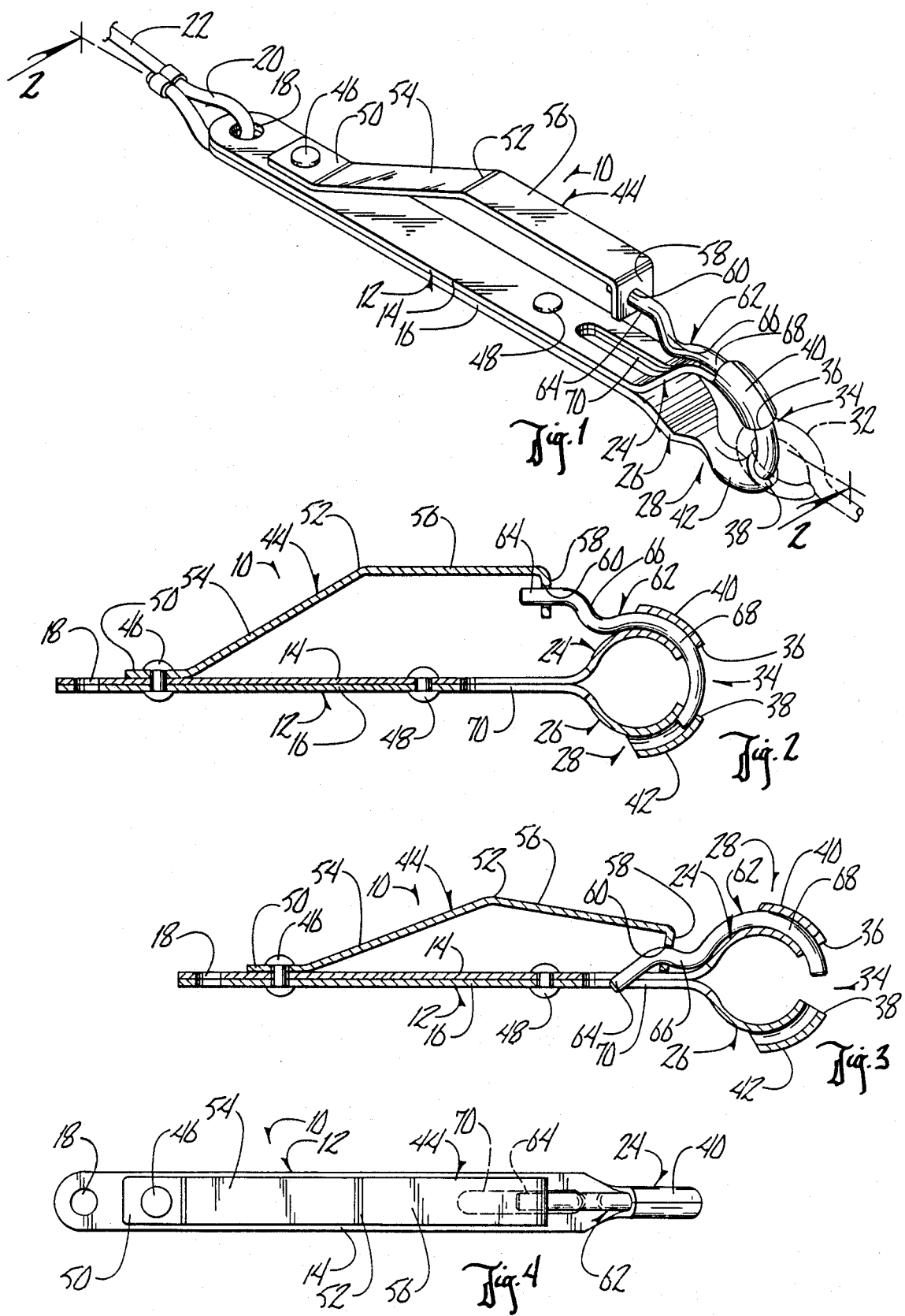

HOOKING MECHANISM

BACKGROUND OF THE INVENTION a. Field of the Invention

The invention relates to a hooking mechanism, and in particular to a hooking mechanism for quick, easy and reliable securing.

b. Problems in the Art

There are many applications which require the hooking of one member to another. Many mechanisms have been developed to accomplish this function, including hook and eye arrangements, buttons, snaps, U-bolts, and on and on.

Particular problems exist where the hook must be strong, secure, and reliable, and yet where it would be most advantageous to be able to quickly hook and unhook the mechanism without special tools, and even preferably with one hand.

Applications where these types of hooks are needed include pet leashes, bridles, boat or sailing lines and stays, support cables, etc. A conventional and widely used type of hook utilizes a strong metal J-shaped hook shank with a resilient safety paddle connected at one end to the shank and extending up to the J-end hook. The paddle is depressed, the item is brought around the J-shaped hook, and the paddle is released to "lock" the item into the hook. Another type of locking hook utilizes a basically C-shaped hook end with a spring loaded locking bar which can be retracted against the spring bias to introduce the item to be hooked, and then released to lock the item in. The locking bar can even be itself "locked" into the locking position of some of these devices for added security.

While these types of hooks have proved to be useful, they are somewhat hard to use and cumbersome, and are susceptible to unreliability after some use. The J-hook and paddle mechanism is particularly unreliable when the paddle becomes sprung after a period of use. The spring loaded C-hook also becomes unreliable because, necessarily, the biasing spring must be small because of the small size of the hooks.

It is therefore a principal object of the present invention to present a hooking mechanism which solves or improves over the problems and deficiencies in the art.

A further object of the present invention is to provide a hooking mechanism which is strong, durable, and reliable.

Another object of the present invention is to provide a hooking mechanism which is extremely easy to operate, even with one hand, or by persons who have strength or gripping problems.

Another object of the present invention is to provide a hooking mechanism which is economical, efficient, and flexible.

Another object of the present invention is to provide a hooking mechanism which is adaptable to many different uses and can be made in many different sizes.

These and other objects, features, and advantages of the invention will become more apparent with reference to the accompanying specification and claims.

SUMMARY OF THE INVENTION

The present invention includes a hooking mechanism which allows quick, easy, and reliable securing and hooking. A shank member has one end which is securable to a connection member such as a cable, chain, rope, or the like. The other end of the shank includes two generally symmetrical curved yoke arms which extend outwardly from the shank and form a generally annular yoke. The yoke formed by the yoke arms has a gap between the very outermost ends of the yoke arms to receive the other item which needs to be hooked. The yoke arms also each have a retaining means to allow slidable movement of a locking member over the gap.

The locking member has a forward portion which generally conforms to the annular shape of the yoke. Its rearward portion extends back towards the shank and is connectable to an actuator member. The actuator member itself has a rear end which is secured to the shank. Its middle portion extends forwardly and upwardly towards the yoke. Its front end is then slidably attached to the rearward portion of the locking member at a position spaced apart from the shank member.

The actuator member is flexible yet resilient and biases the locking member to a normally closed position. In the normally closed position, the locking member slidably moves over the gap between the outermost ends of the yoke arms so that its forward portion is extended at least partially into the retaining means on the second yoke arm. The forward portion of the locking member is always slidably retained in the retaining means of the first yoke arm.

By depressing the actuator means towards the shank, the rear portion of locking member moves toward the shank, which in turn causes the forward portion of the locking member to slidably move within the retaining means of the yoke arms. Upon sufficient depression of the actuator means, the locking member moves out of the retaining means of the second yoke arm and opens at least a portion of the gap. The item to be hooked is then inserted into the middle of the yoke, and then the actuator means can be released causing the locking member to again return to the retaining means of the second yoke arm, blocking the gap and locking the item into the hooking mechanism.

BRIEF DESCRIPTION OF THE DRAWINGS

FIG. 1 is a perspective view of one embodiment of the invention.

FIG. 2 is a sectional view taken along line 2—2 of FIG. 1.

FIG. 3 is a sectional view similar to that of FIG. 2, but showing the hooking mechanism in an open position.

FIG. 4 is a top view taken along lines 4—4 of FIG. 3.

DETAILED DESCRIPTION OF THE PREFERRED EMBODIMENT

With reference to the drawings, and particularly FIG. 1, there is shown a locking mechanism 10 according to the present invention. Locking mechanism 10 includes a shank 12, formed by top and bottom plates 14 and 16. An aperture 18 extends through plates 14 and 16 at one end of shank 12 and receives loop 20 of cable 22. The opposite ends of plates 14 and 16 have curved yoke arms 24 and 26 extending therefrom. Yoke arms 24 and 26 are generally identical and oppositely symmetrical from one another, defining a generally annularly shaped yoke generally designated by reference numeral 28. Yoke 28 is adapted to receive an item to be hooked such as eye hook 32. A gap (generally referred to by reference numeral 34) exists between outermost ends 36 and 38 of yoke arms 24 and 26.

Additionally, each yoke arm has a retaining member 40 and 42 which is basically a curved tubular sleeve integrally formed into each yoke arm 24 and 26. The retaining members 40 and 42 extend, in the preferred embodiment, to the outermost ends 36 and 38 of yoke arms 24 and 26.

An actuator member 44 is secured at a rear end to shank 12 by rivet 46. Rivet 46 also assists in securing top and bottom plates 14 and 16 to one another. A second rivet 48, towards the front of shank 12, accomplishes the same. The rear end 50 of actuator member 44 is flat and generally abuts top plate 14 of shank 12. Middle portion 52 of actuator 44 includes a first part 54 which slants upwardly and outwardly from rear end 50 towards the front of shank 12, and a second part 56 which extends still further towards the front of shank 12, but generally parallel to shank 12. A front end 58 of actuator 44 then extends perpendicularly from the second part 56 of middle portion 52 of actuator 44 down towards top plate 14 of shank 12. Front end 58 includes an aperture 60.

A locking member 62 cooperates with actuator 44 to move locking mechanism 10 between a normally closed and an open position for hooking items such as eye hook 32. In the preferred embodiment, locking member 62 is formed from a circular-in-cross-section elongated piece. Locking member 62 has a rear portion 64 which is slidably insertable into aperture 60 of actuator 44, a middle portion 66 which extends angularly and forwardly from rear portion 64, and a forward portion 68 which is curved to generally conform with the outer circumferential surface of yoke arms 24 and 26. Forward portion 68 of locking member 62 is sized so as to be slidably movable through retaining members 40 and 42.

As can be seen in FIG. 1, and as also shown in FIG. 2, locking mechanism 10 is biased to a normally closed position, with locking member 62 blocking gap 34, because actuator 44 is made of a flexible but resilient material. When no forces are applied to actuator 44, retaining members 40 and 42 securely hold forward portion 68 of locking member 62 across gap 34.

Referring now to FIG. 3, it can be seen that when actuator 44 is depressed towards shank 12, rear portion 64 of locking member 62, retained in aperture 60 of actuator 44, is forced also towards shank 12, which in turn causes forward portion 68 of locking member 62 to slidably move so as to be removed from retaining member 42 to open at least a portion of gap 34. It is to be understood that forward portion 68 of locking member 62 continues to be securely but slidably retained in retaining member 40. Locking mechanism 10 is therefore moved to an open position which allows insertion of items such as eye hook 32 of FIG. 1. By releasing locking member 62, it resiliently returns to the position of FIGS. 1 and 2, and moves forward portion 68 of locking member 62 back to the normally closed position shown in FIGS. 1 and 2, locking and securing any item into yoke 28.

By referring to the figures, and also to FIG. 4, it can be seen that the preferred embodiment includes a slot 70 formed within top and bottom plates 14 and 16 adjacent to yoke 28 at the front end of shank 12. Slot 70 functions to receive rear portion 64 of locking member 62 when actuator 44 is depressed.

It can therefore be seen that the invention meets or exceeds all its stated objectives.

The included preferred embodiment is given by way of example only, and not by way of limitation to the invention, which is solely described by the claims herein. Variations obvious to one skilled in the art will be included within the invention defined by the claims.

What is claimed is:

1. A hooking mechanism for quick, easy and reliable securing.comprising:
    a shank member having a longitudinal axis, an anchor end, and a hooking end opposite of the anchor end;
    first and second opposite generally curved yoke arms extending outwardly from the hooking end, said yoke arms generally defining an annular yoke but having a gap between the outermost ends of the yoke arms;
    retaining means positioned along each of said first and second yoke arms;
    a locking member having a rear portion and a forward portion, and being movable between an open and a locked position, the forward portion being slidably retained in the retaining means of the first yoke arm, being curved to generally conform to the outer circumference of the annular yoke formed by the first and second yoke arms, and being slidably retainable in the retaining means of the second yoke arm when moved from the open to the locked position, blocking the gap;
    an actuator member having a rear end secured to the shank member, a middle section extending along the longitudinal axis of the shank member to a front end, the rear portion of the locking member being slidably insertable into the front end of the actuator member, the actuator member biasing the locking member to a locked position closing the gap and being retained in the retaining means of the first and second yoke arms, but being resiliently flexible so that when the middle section of the actuator member is depressed towards the shank member, the rear portion of the locking member is forced towards the shank member causing the forward portion to slidably move out of the retaining portion of the second yoke arm a distance sufficient to open at least a portion of the gap between the outermost ends of the yoke arms.

2. The mechanism of claim 1 wherein the shank member is elongated along its longitudinal axis.

3. The mechanism of claim 1 wherein the hooking end of the shank member is adapted to receive and retain a connecting means.

4. The mechanism of claim 1 wherein the shank member is comprised of first and second parts secured together.

5. The mechanism of claim 4 wherein the first and second opposite yoke arms extend respectively from the first and second parts of the shank member.

6. The mechanism of claim 1 wherein the first and second yoke arms have an outer circumferential surface.

7. The mechanism of claim 6 wherein the forward portion of the locking member generally matingly conforms to the outer circumferential surface of the first and second yoke arms.

8. The mechanism of claim 1 wherein the locking member is qenerally round in cross section.

9. The mechanism of claim 1 wherein the forward portion of the locking member is curved in a generally C-shaped, and the rear portion is generally straight.

10. The mechanism of claim 9 wherein the locking member further comprises a middle portion between the rear and front portions which is angled.

11. The mechanism of claim 1 wherein the rear end of the actuator member is secured generally parallel to the longitudinal axis of the shank member, the middle section has a first portion extending from the rear end upwardly and forwardly generally along the longitudinal axis of the shank member, and a second portion extending generally along but at a spaced apart position from the longitudinal axis of the shank member, and the front end of the actuator member extending generally perpendicularly from the second portion of the middle section downwardly towards the shank member and having an aperture to receive the rear portion of the locking member.

12. The mechanism of claim 1 wherein the shank member further comprises a slot positioned at its hooking end so as to allow the rear portion of the locking member to be received when the actuator member is depressed to move the locking member to an open position.

13. The mechanism of claim 1 wherein the retaining members are curved tubular sleeves.

* * * * *